UNITED STATES PATENT OFFICE.

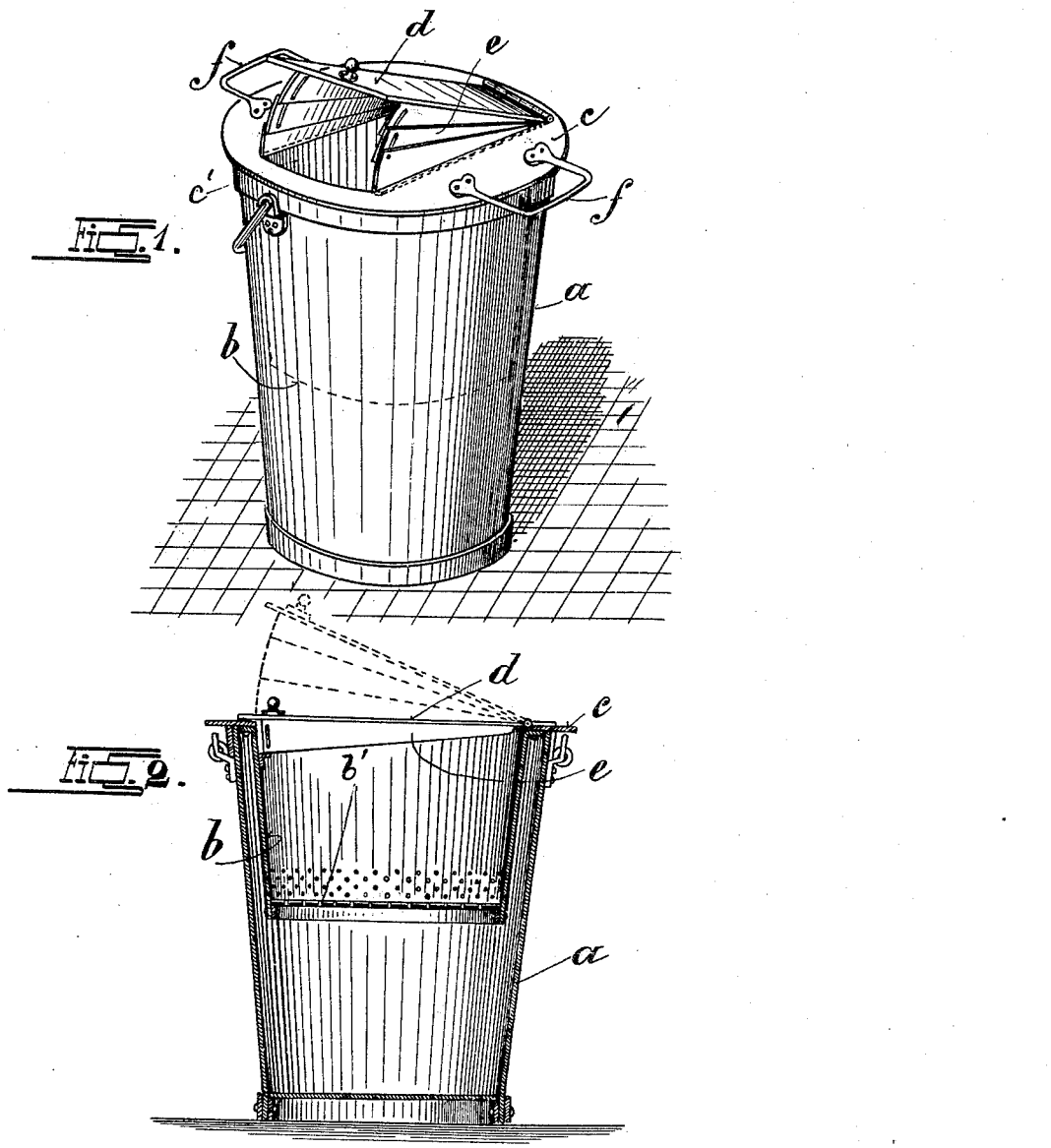

MARTHA KREBS, OF GROSS PETERWITZ, GERMANY.

CINDER-SIFTER.

SPECIFICATION forming part of Letters Patent No. 681,798, dated September 3, 1901.

Application filed March 6, 1901. Serial No. 50,119. (No model.)

*To all whom it may concern:*

Be it known that I, MARTHA KREBS, a subject of the Emperor of Germany, and a resident of Gross Peterwitz, near Canth, Silesia, Germany, have invented certain new and useful Improvements in Cinder-Sifters, of which the following is a specification.

This invention relates to cinder-sifters and pails, and has for its object to provide a simple and efficient means for separating any useful pieces of coal or the like from the ashes and of preventing the dust from flying about when emptying the ashes into the pail or when emptying the sifter.

This invention will be readily understood by referring to the accompanying drawings, in which—

Figure 1 is a perspective view of a cinder-pail fitted with my invention, and Fig. 2 is a vertical section through the pail.

Referring to the drawings, the body of the pail is shown at $a$ and may be of the usual or any desired construction.

$c$ represents a cover, which is provided with an opening $c'$ therein, which is surrounded by a sifter portion in the shape of a receptacle $b$, depending from the edge of the cover $c$, to which it is rigidly connected, and provided with a perforated or foraminous bottom $b'$. The opening $c'$ is provided with a hinged lid $d$, adapted to be raised to permit the shovel to be inserted at the rear of the opening, and in order to close the sides of the space between lid $d$ and cover $c$ I provide a plurality of telescoping plates $e$, which are slidingly connected together and to the cover $c$. I prefer to provide the cover $c$ with handles $f$, by means of which it may be rotated to agitate the sifter and lifted off when desired.

In use the cinders are put into the sifter $b$ by means of a shovel after lifting the lid $d$, which it will be seen is only open at one end, the sides being closed by the side pieces $e$. The lid $d$ is now dropped, while the cinders are emptied from the shovel. The shovel can now be removed and the lid entirely closed, while the sifter is agitated by means of the handles $f f$, the dust falling into the lower part of the pail. For emptying the sifter it may be lifted out of the pail and turned upside down, while the lid $d$ is kept closed. Then by carefully lifting the sifter the lid $d$ opens, and it is then possible to draw away the sifter from the ashes without disturbing the cinders, and thus the operation is performed without raising the dust.

Having now particularly described and ascertained the nature of my said invention and in what manner the same is to be performed, I declare that what I claim is—

The combination, with a suitable pail, of a cover therefor having a depending receptacle formed with a foraminous bottom, said cover having an opening leading into said receptacle, a hinged lid for said opening, and telescoping plates connecting the lid with the side edges of said opening, substantially as described and for the purposes set forth.

In witness whereof I have hereunto set my hand in presence of two witnesses.

MARTHA KREBS.

Witnesses:
WILHELM WEIDNER,
JOHANNES KREBS.